(12) United States Patent
Lo

(10) Patent No.: US 6,983,988 B1
(45) Date of Patent: Jan. 10, 2006

(54) BACKREST ADJUSTING DEVICE FOR A BICYCLE

(75) Inventor: Jih-Sheng Lo, Kaohsiung (TW)

(73) Assignee: Fortune Institute of Technology, Kaohsiung (TW)

( * ) Notice: Subject to any disclaimer, the term of this patent is extended or adjusted under 35 U.S.C. 154(b) by 0 days.

(21) Appl. No.: 10/994,488

(22) Filed: Nov. 23, 2004

(51) Int. Cl.
*B62J 1/00* (2006.01)

(52) U.S. Cl. ............................. 297/215.12; 297/215.1; 297/215.11

(58) Field of Classification Search ............ 297/440.15, 297/215.1, 215.11, 215.12, 284.9, 284.3, 297/423.12, 487, 488; 280/304.4; 482/142
See application file for complete search history.

(56) References Cited

U.S. PATENT DOCUMENTS

| | | | | |
|---|---|---|---|---|
| 1,527,754 A | * | 2/1925 | Simon | .......................... 601/24 |
| 3,764,180 A | * | 10/1973 | Mulholland | .................. 297/400 |
| 4,967,864 A | * | 11/1990 | Boyer et al. | ................ 180/65.1 |
| 5,447,356 A | * | 9/1995 | Snijders | .................... 297/284.3 |
| 5,501,476 A | * | 3/1996 | Howell et al. | .............. 280/230 |
| 6,361,118 B1 | * | 3/2002 | Melgarejo et al. | ........... 297/488 |
| 6,378,947 B1 | * | 4/2002 | Barber et al. | ........... 297/452.25 |
| 6,460,927 B1 | * | 10/2002 | Groth | ....................... 297/284.9 |
| 6,460,933 B1 | * | 10/2002 | Bors et al. | ................ 297/440.2 |
| 6,543,853 B1 | * | 4/2003 | Splane, Jr. | ............. 297/423.12 |
| 6,565,154 B2 | * | 5/2003 | Davis | .......................... 297/352 |
| 6,802,563 B1 | * | 10/2004 | Mysliwiec et al. | ....... 297/284.9 |

* cited by examiner

*Primary Examiner*—Anthony D. Barfield
*Assistant Examiner*—Erika Garrett
(74) *Attorney, Agent, or Firm*—Rosenberg, Klein & Lee

(57) ABSTRACT

A backrest-adjusting device for a bicycle is specially designed for persons who are handicapped or try to rectify the body, including a backrest adjusting set and a breast-support adjusting set for securing a rider on a bicycle stably by adjusting the position of the backrest and the waist pad and the torso supports according to the rider's body size. Then the rider can be protected from falling down to get wounded or injured, safely using the bicycle.

4 Claims, 12 Drawing Sheets

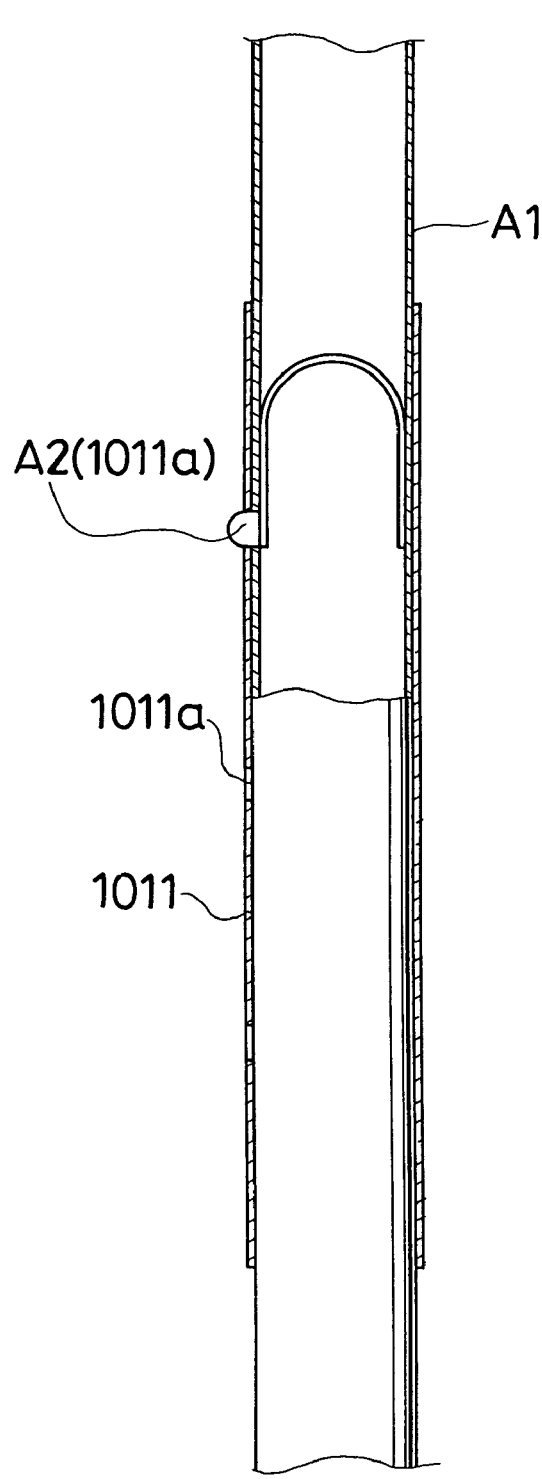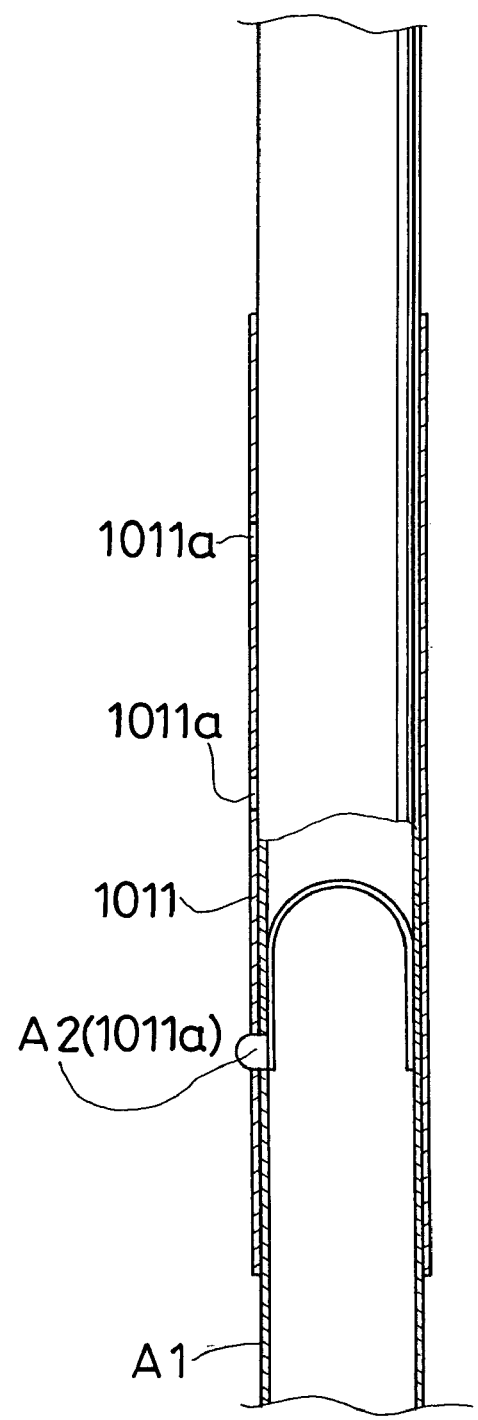
F I G. 6
F I G. 7

BACKREST ADJUSTING DEVICE FOR A BICYCLE

BACKGROUND OF THE INVENTION

1. Field of the Invention

This invention relates to a backrest adjusting device for a bicycle, particularly to one specially suitable for the handicapped or limb rectifiers with rectifying functions for sitting postures of a user (rider) on the bicycle and preventing the user from falling down, extremely safe for using.

2. Description of the Prior Art

A conventional backrest for a bicycle shown in FIG. 16 includes a frame 31, a headrest 32 fixed on top of the frame 31, two breast-clamp rods 33 provided at two sides of the frame 31 and facing to each other, and a U-shaped waist clamp rod fixed with the frame 31, and a connector 35 connecting the lower end of the frame 31 with the bicycle frame.

In using, a rider has the head resting on the headrest 32, the breast and the waist secured by the breast clamp rods 33 and the waist clamp rod 34 so that the rider may not fall off the bicycle to get wounded or injured.

However, the conventional bicycle backrest is not provided with a backrest, but with a headrest and the breast and the waist clamp rod(s), so it is not so comfortable as it seems without any elastic means for the body of a rider to feel comfortableness.

SUMMARY OF THE INVENTION

The backrest adjusting device for a bicycle in the invention is designed for specially handicapped persons or persons who try to rectify their bodies, including a backrest adjusting set and a torso-support adjusting set to secure a rider stably on the bicycle without possibility of falling down to get wounded or injured, and to give medical treatment function for a body-rectifier with safety in use

BRIEF DESCRIPTION OF DRAWINGS

This invention will be better understood by referring to the accompanying drawings, wherein;

FIG. 6 is a cross-sectional view of a sleeve of a backrest-adjusting unit being adjusted in one way in the present invention;

FIG. 7 is a cross-sectional view of the sleeve of the backrest-adjusting unit being adjusted in another way in the present invention;

DETAILED DESCRIPTION OF THE PREFERRED EMBODIMENT

Figure 1:
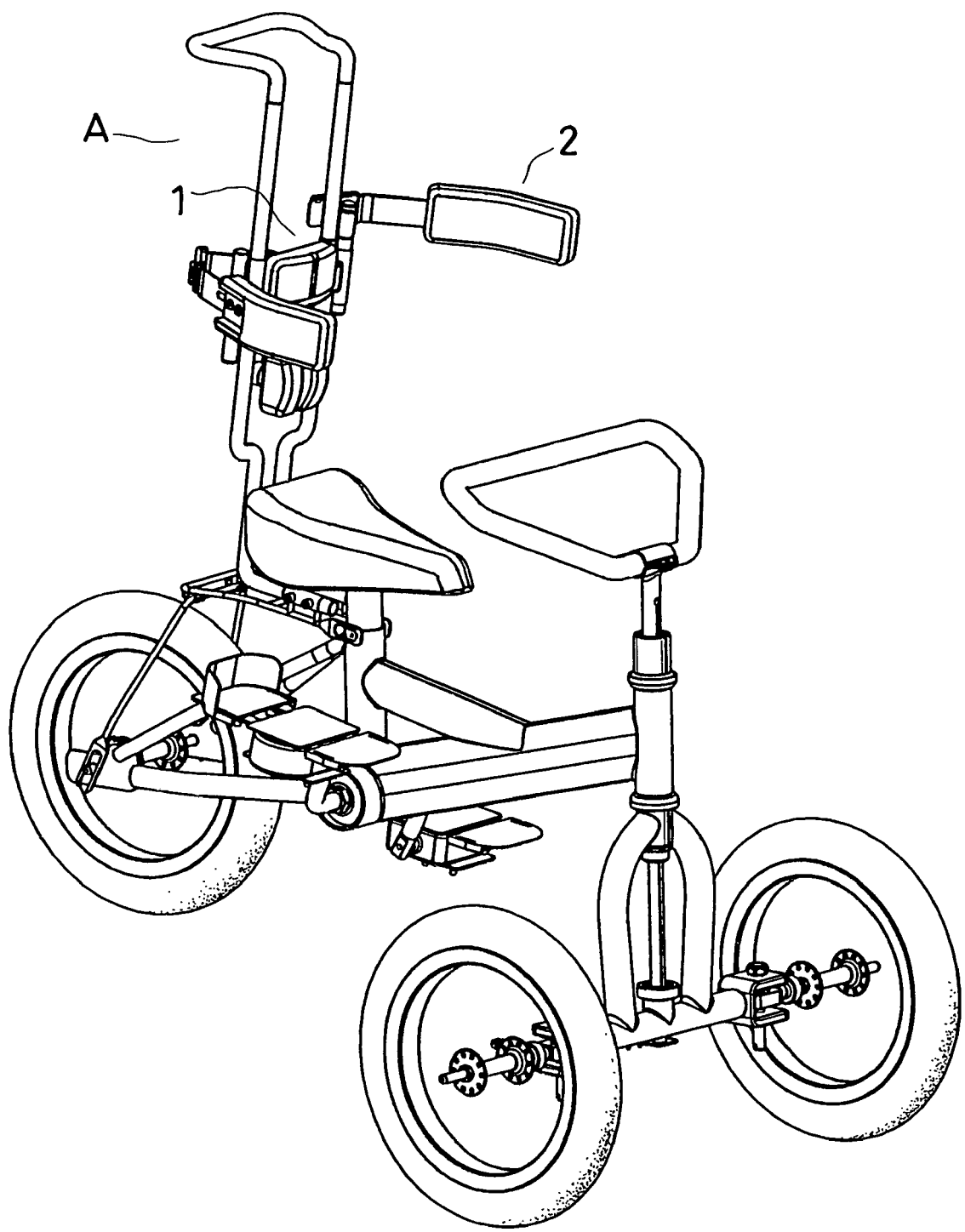
FIG. 1 is a perspective view of a bicycle with a backrest-adjusting device in the present invention.
Figure 2:
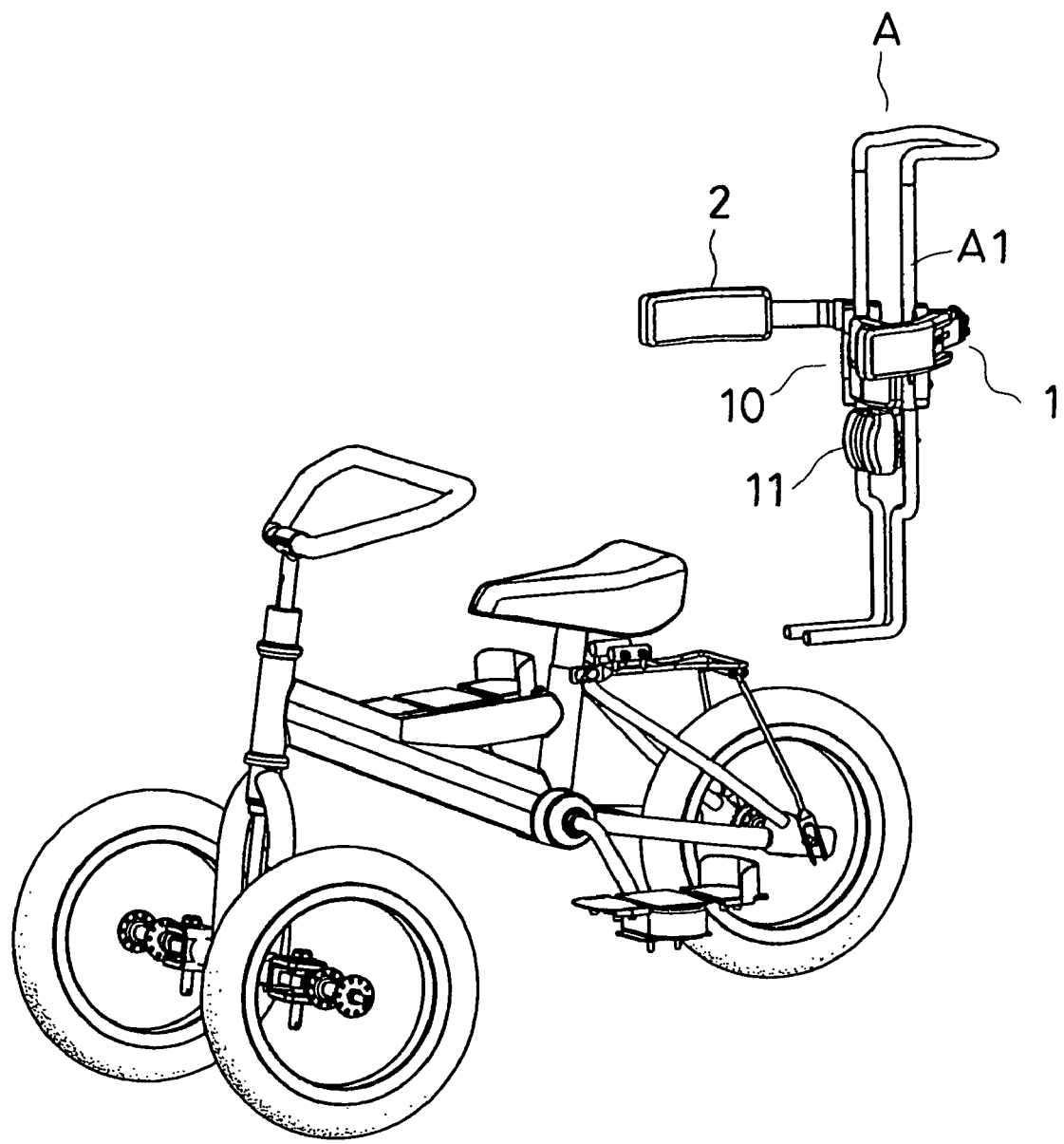
FIG. 2 is a perspective view of the backrest-adjusting device separated from a bicycle in the present invention.
Figure 3:
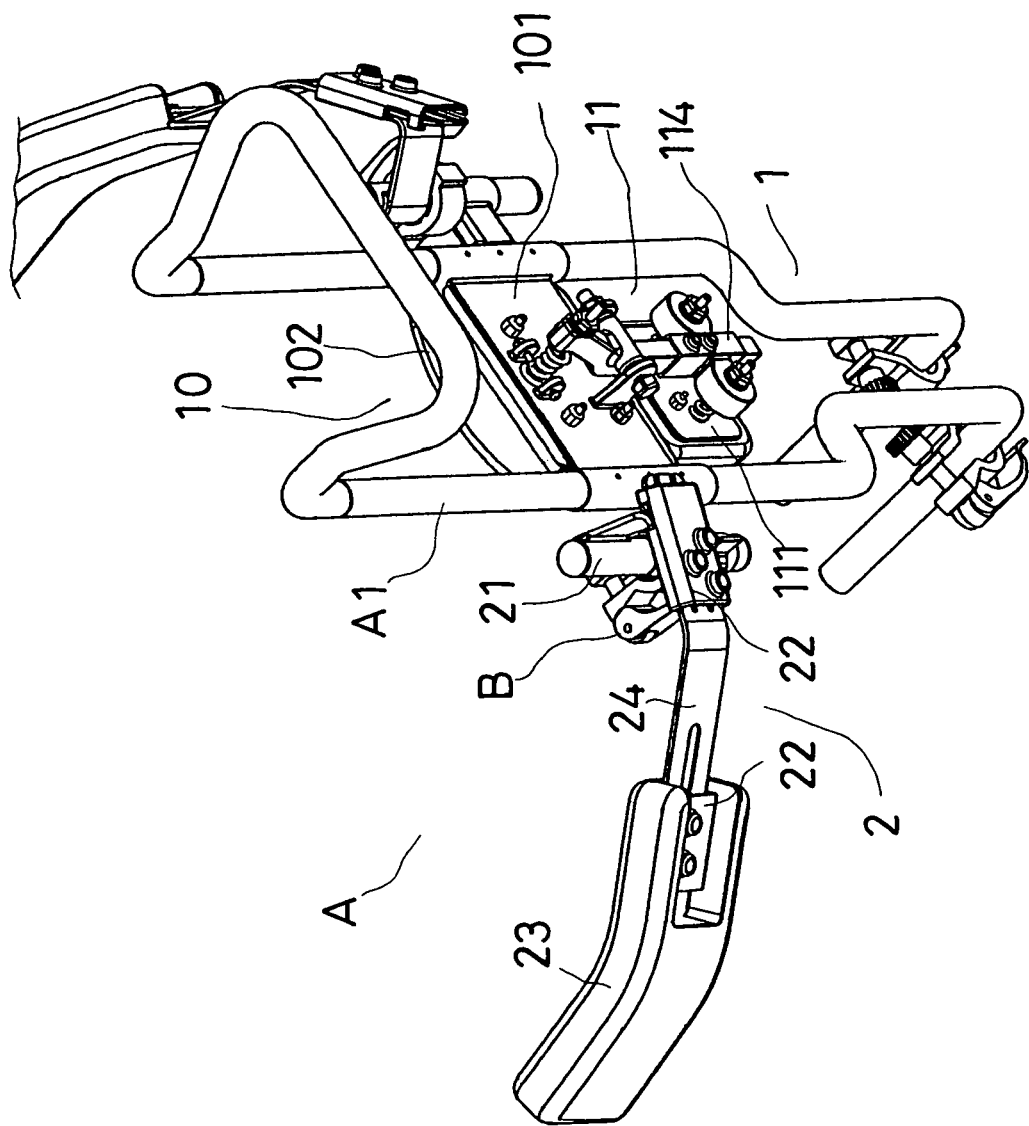
FIG. 3 is an exploded perspective view of the backrest-adjusting device in the present invention.
Figure 4:
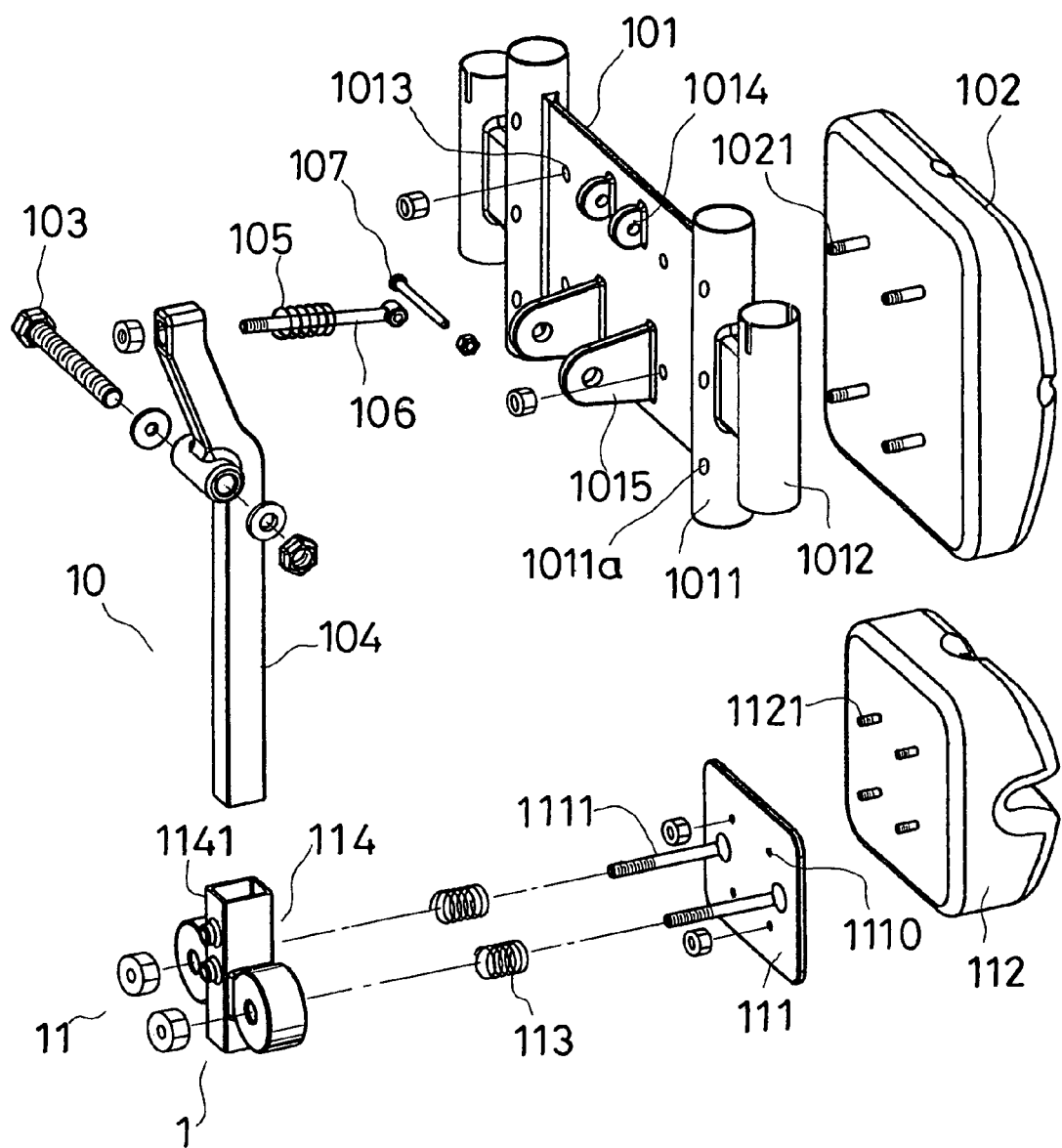
FIG. 4 is an exploded perspective view of a backrest-adjusting unit in the present invention.

A preferred embodiment of a backrest-adjusting device (A) for a bicycle in the present invention, as shown in FIGS. 1, 2 and 3, includes a backrest adjusting set 1 and two torso-support sets 2 arranged on a frame rod (A1).

The backrest adjusting set 1 consists of a backrest-adjusting unit 10 and a waist-pad-adjusting unit 11.

The backrest adjusting unit 10 has a backrest board 101, two cylinders 1011 respectively fixed at two vertical sides of the backrest board 101 and fitting movably around the frame rod (A1), a sleeve 1012 fixed at an outer side of each cylinder 1011 for combining with the torso-support unit 11. The backrest board 101 has plural screw holes 1013 for screws 1021 of a backrest 102 to engage with, two spaced-apart upper position ears 1014 and two spaced-apart lower position ears 1015 on an inner surface. The lower position ears 1015 have a hole for a bolt 103 to fit through for pivotally connecting an activating rod 104, which has a pivotal rod 106 fitted in an upper end, and a spring 105 fits around the pivotal rod 106, and then a pin 107 passes through the outer end of the pivotal rod 106 and the two upper position ears 1014 of the backrest board 101 to secure the activating rod 104 with the backrest board 101.

The waist-pad adjusting unit 11 has a waist-pad board 111 provided with screw holes 1110 for screws 1121 of a waist pad 112 to engage with for securing the waist pad 112 with the waist-pad board 111. The waist-pad board 111 further has two part-threaded rods 1111 extending laterally from the inner surface to pass through a position base 11, with a spring 113 fitting around each of the rods 1111, and then the position base 11 has a square sleeve 1141 for the square activating rod 104 to fit in movably. Thus the springs 113 have its front end pushing against the rear side of the waist-pad 112 and its rear end pushing against the front side of the position base 114.

Figure 5:
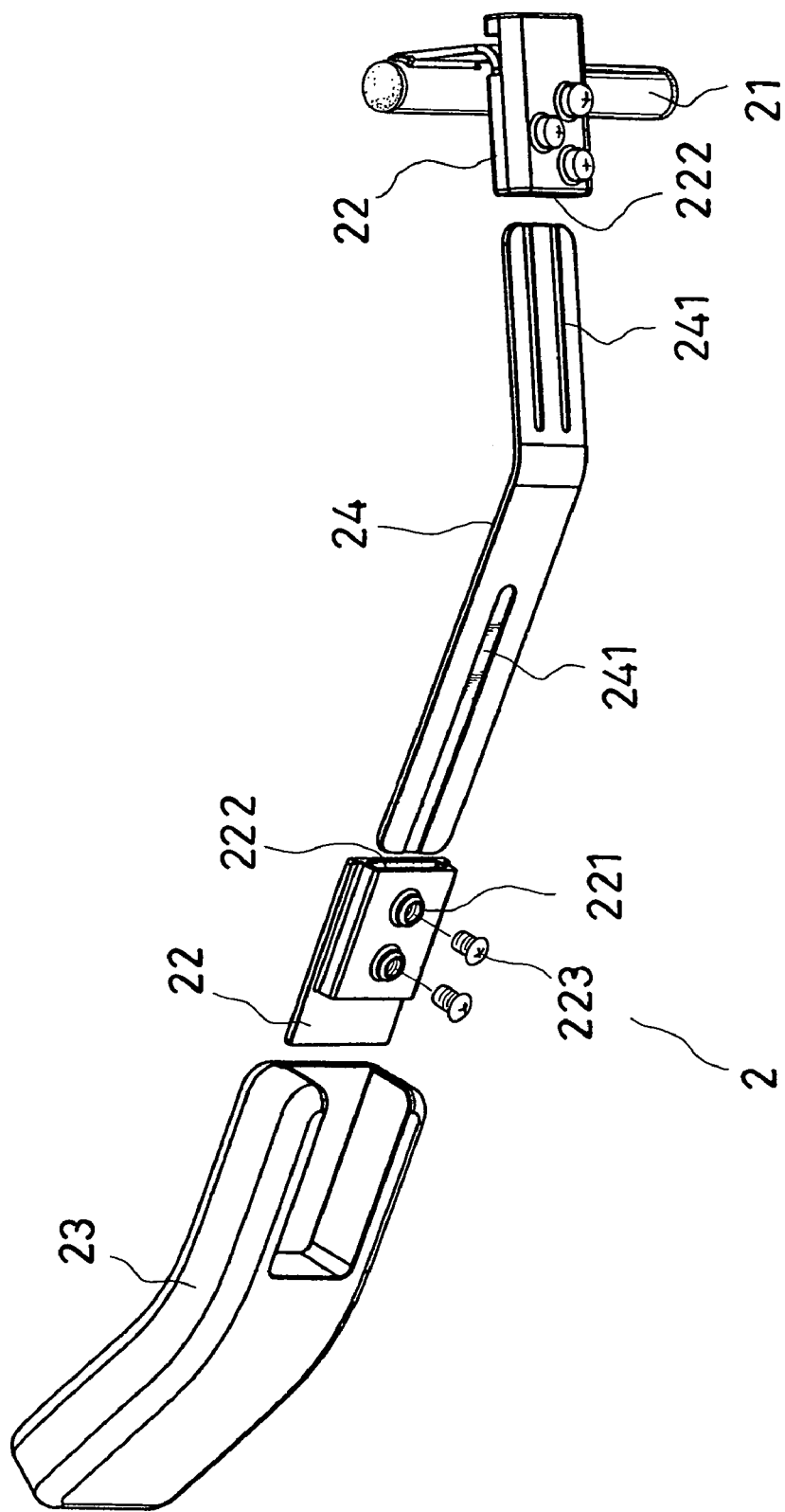
FIG. 5 is an exploded perspective view of a torso-support unit in the present invention.
Figure 8:
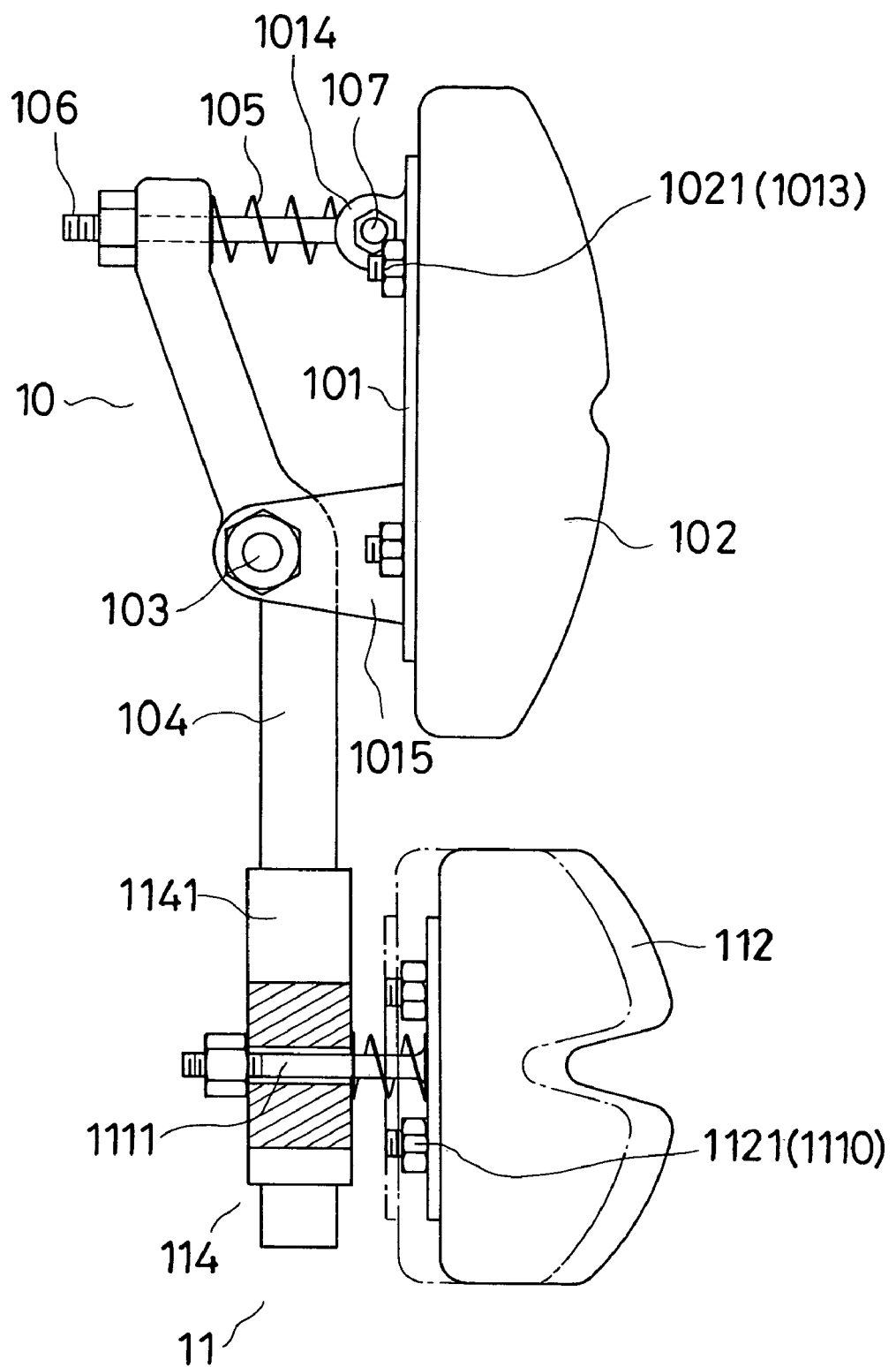
FIG. 8 is a side view of the backrest-adjusting unit being adjusted in one way in the present invention.
Figure 9:
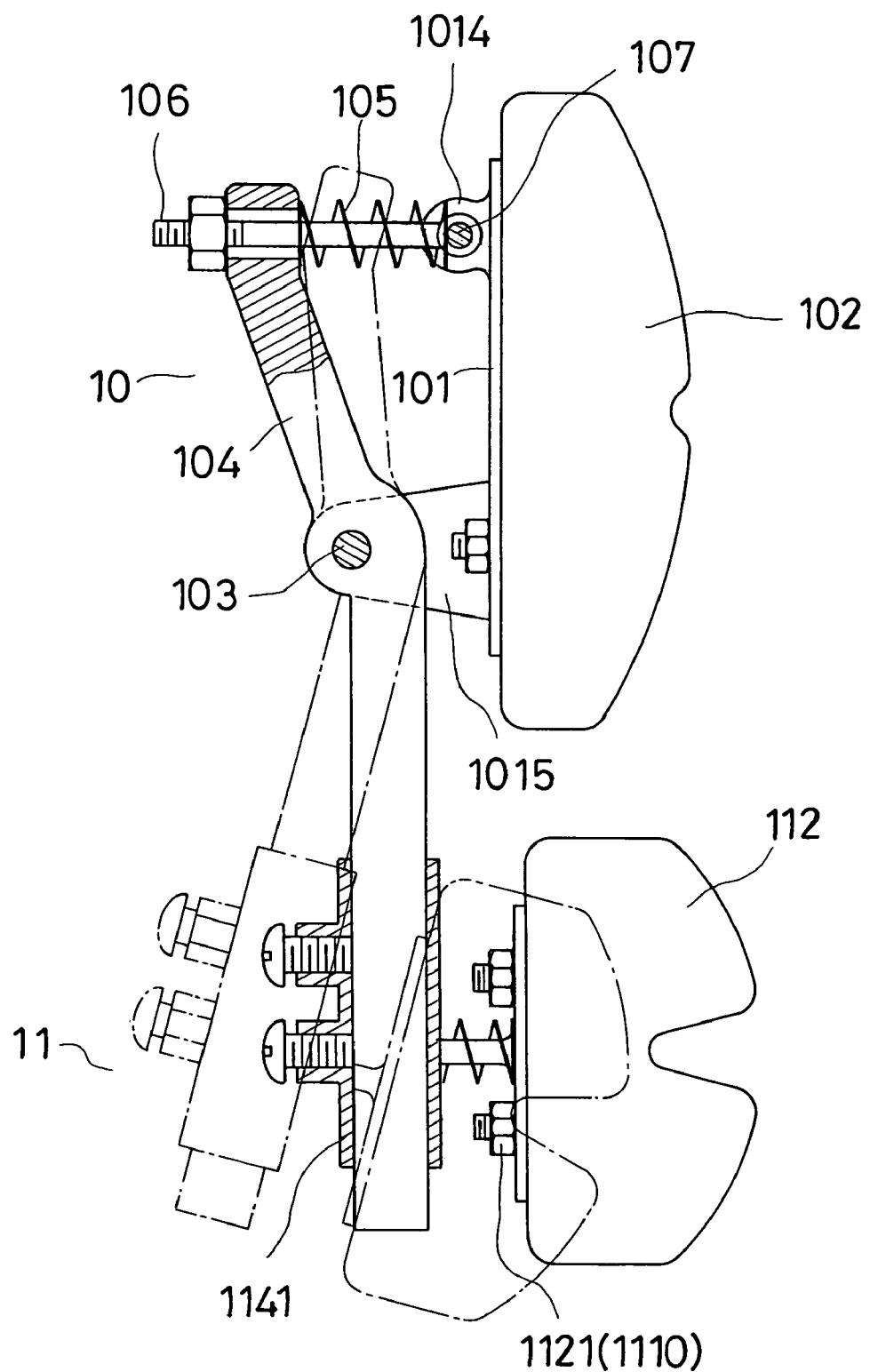
FIG. 9 is a side view of the backrest-adjusting unit being adjusted in another way in the present invention.
Figure 10:
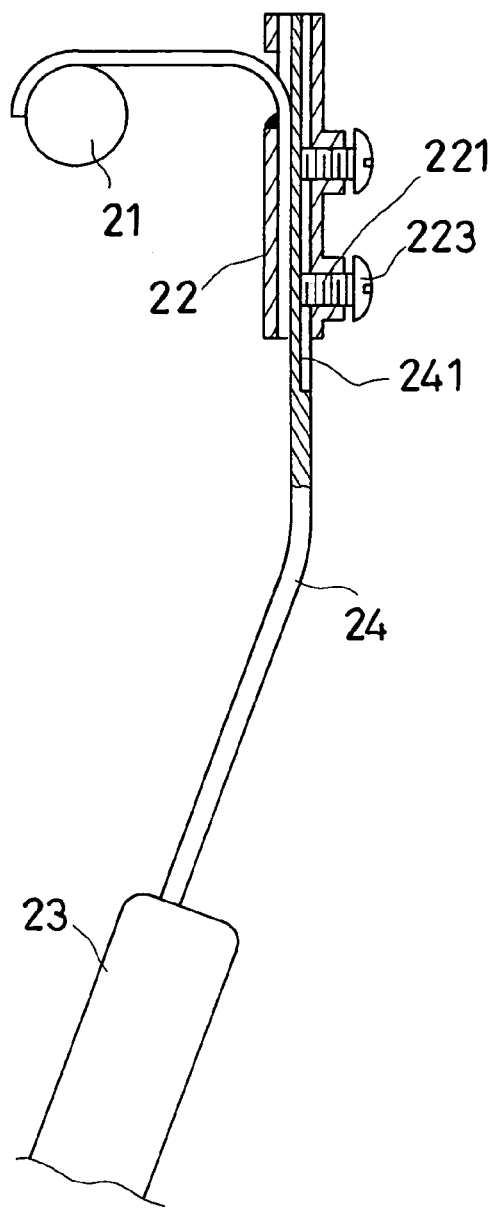
FIG. 10 is a side cross-sectional view of a torso-support unit being adjusted in one way in the present invention.
Figure 11:
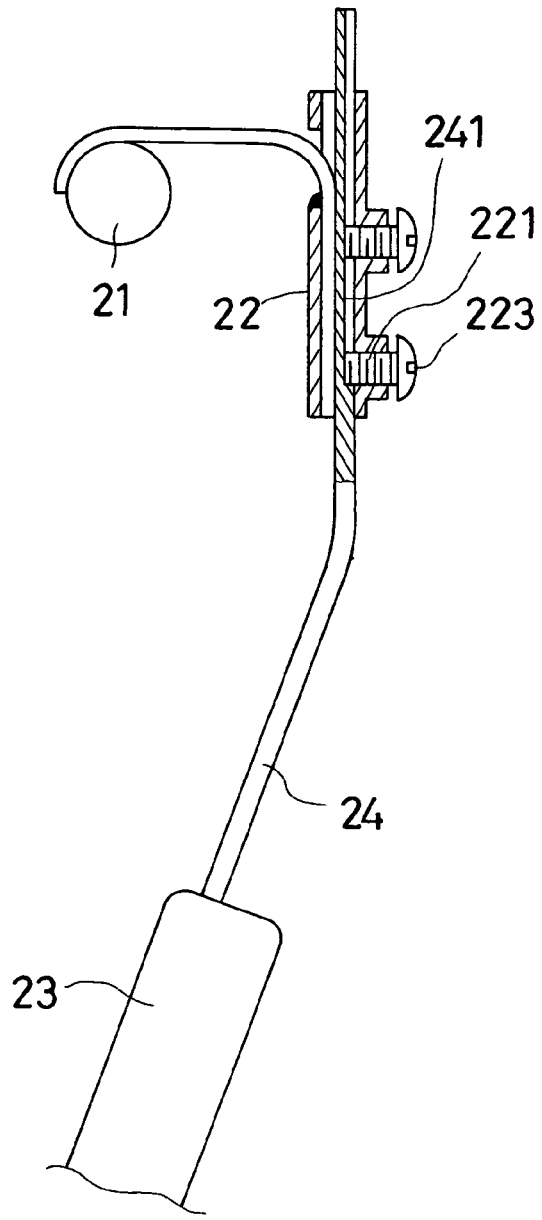
FIG. 11 is a side cross-sectional view of the torso-support unit being adjusted in another way in the present invention.
Figure 12:
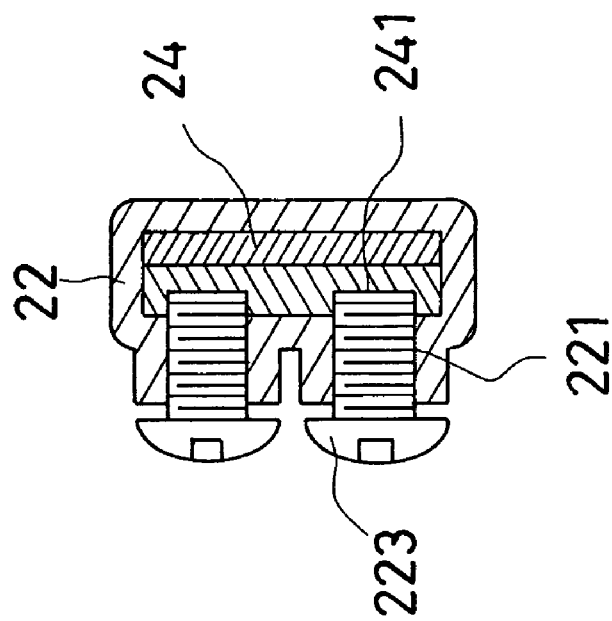
FIG. 12 is a partial magnified view of the torso-support unit in the present invention.
Figure 15:
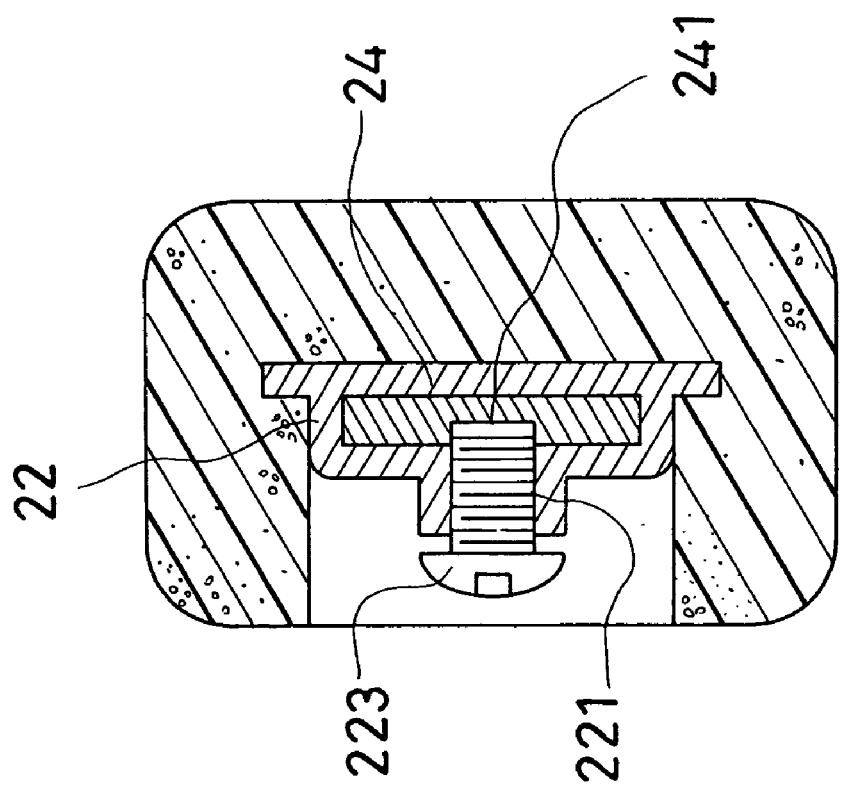
FIG. 15 is another partial magnified side cross-sectional view of the torso-support unit in the present invention; and, FIG. 16 is a perspective view of a conventional backrest-adjusting device fixed on a bicycle.
Figures 13, 14:
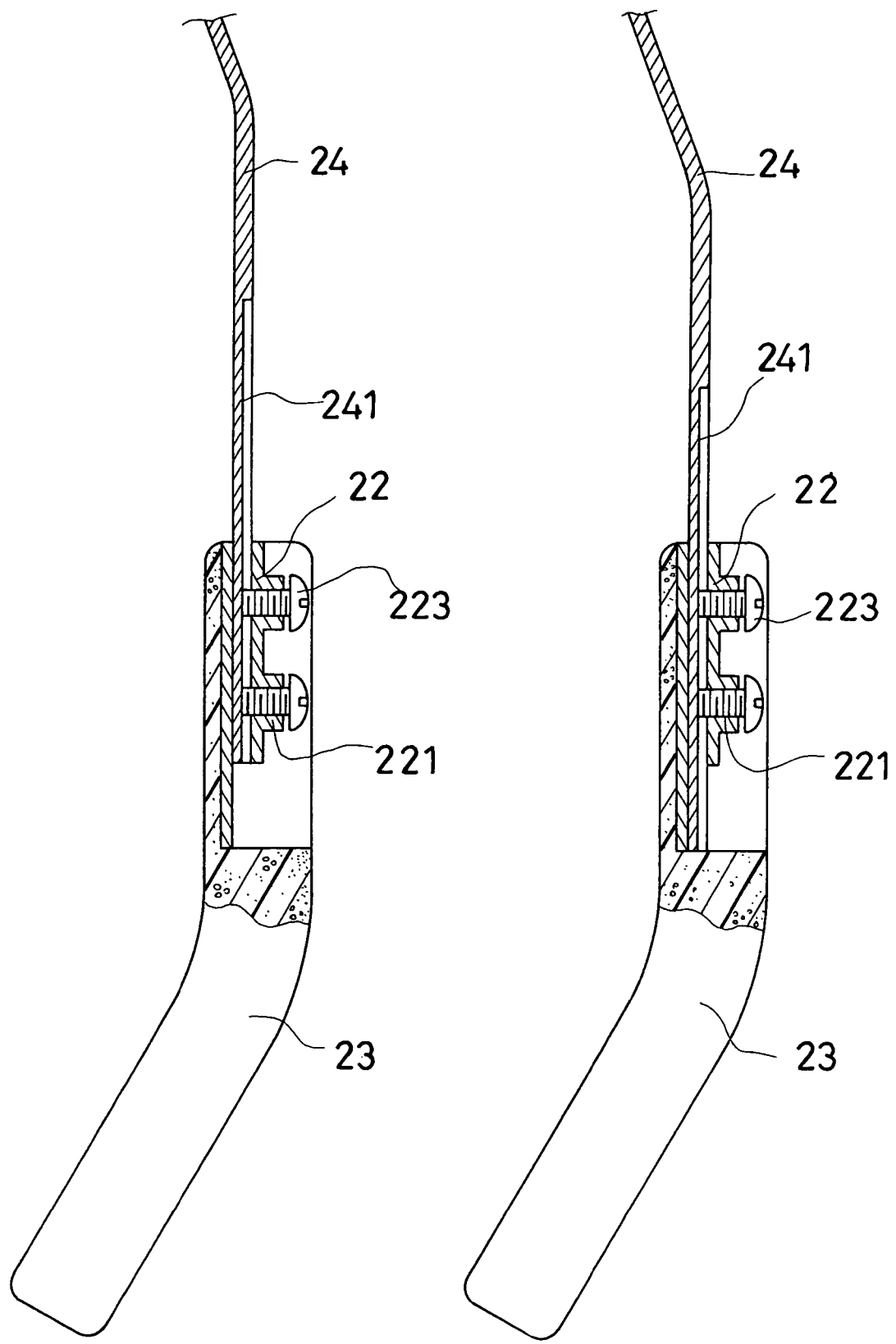
FIG. 13 is a side cross-sectional view of the torso-support unit being adjusted in one way in the present invention.
FIG. 14 is a side cross-sectional view of the torso-support unit being adjusted in another way in the present invention.
Figure 16:
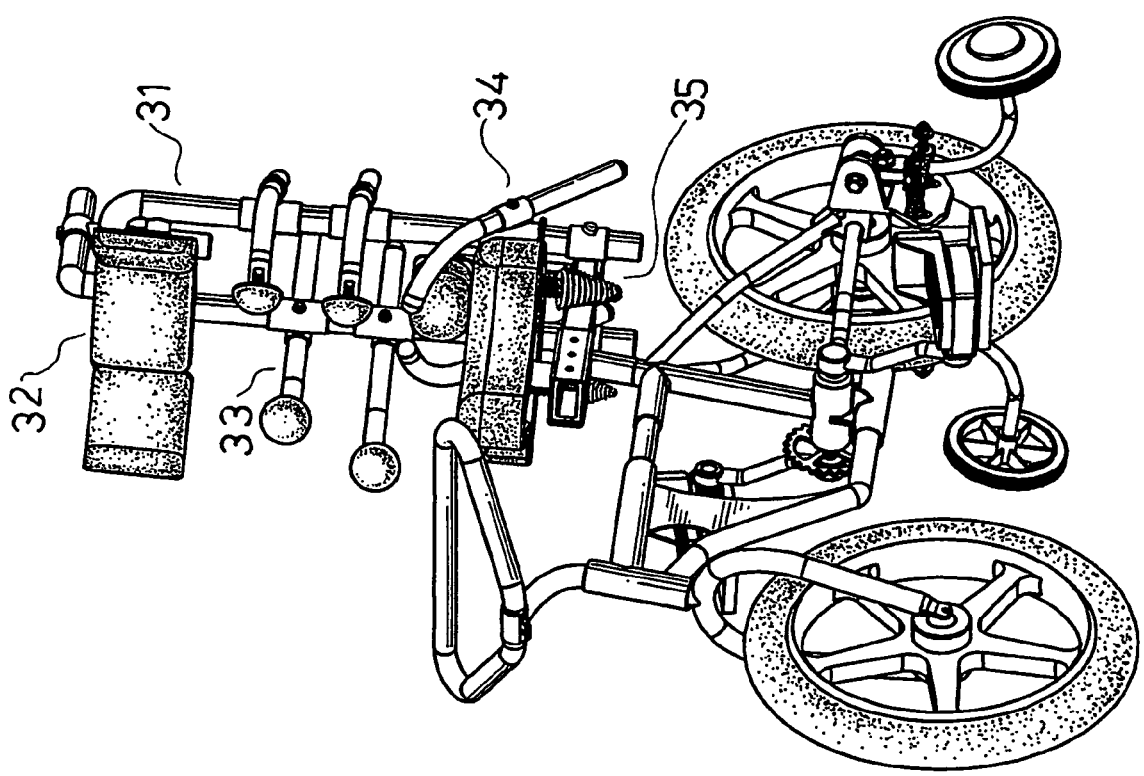

Further, referring to FIG. 5, the two torso-support sets 2 respectively have an insert rod 21 inserting in each cylinders 1011 of the backrest board 101, a connector 22 fixed with an intermediate portion of each insert rod 21, a protective pad 23 connected to another connector 22 provided with two screw holes 221. The two connectors 22 both have a groove 222 in an inner side for one end of a protective band 24 to fit therein. The protective band 24 has a long slide slot 241 in the left portion and two slide slots 241 in the right portion for screws 223 engaging with the screw holes 221 to fit and slide therein.

In using, referring to FIGS. 6, 7, 8, and 9, firstly the cylinders 1011 are fitted around the frame rod (A1), which has an elastic projection (A2) fitting out of one of position holes 1011a to secure the cylinder 1011 at the position. Then when the elastic projection (A2) is pressed into the cylinder 1011 through that of the position holes 1011a, the cylinders 1011 can freely move up and down along the frame rod (A1) to change its locations relative to the frame rod (A1) so as to adjust the locations of the backrest adjusting unit 10 and the breast-support unit 11. After the cylinders 1011 are moved to a best wanted position for the back of a rider to rest on, the waist-support adjusting unit 11 can be adjusted for the waist of the rider to rest against, by moving the position base 114 up or down along the activating rod 104 to let the waist pad 112 moved to suit to the waist of the rider. As the activating rod 104 is pivotally connected to the lower position ears 1015, which can control the spring 105 pivotally connected to the upper ears 1014 to lengthen or shrink to secure movably the activating rod 104 together the position base 11, the activating rod 114 can seesaw with the bolt 103 function as a fulcrum. In addition, the spring 105 can keep the backrest 102 elastically supported, and the two springs 113 can keep the waist pad 112 elastically supported, so that the rider can rest comfortably on the backrest 102 and the waist pad 112 with the resiliency of the springs 105 and 113.

After the backrest 102 and the waist pad 112 are adjusted, the two torso-support adjusting sets 2 are to be handled, referring to FIGS. 10, 11, 12, 13, 14 and 15. The torso-support adjusting sets 2 respectively have the insert rod 21 fitting in the two sleeves 1012 of the backrest board 101 and secured by a constrictor (B) stably. Then the protective pads 23 are moved inward or outward relative to the protective band 24, with the screws 223 sliding along the slide slots 241 so as to let the protective pads 23 may lightly contact the two sides of the breast of the rider for protection, as different persons have different sizes of their breast. Then the screws 223 are tightened to keep immovable the protective pads 23 at that adjusted position, finishing the adjusting work of the torso-support adjusting sets 2.

The backrest-adjusting device for a bicycle in the invention has the following advantages as can be understood from the foresaid description.
1. The backrest adjusting set and the torso-support adjusting set can keep stably an especially handicapped rider or a body rectifier so as to prevent the rider from falling down.
2. The back, the waist and the torso of a rider can be all protected by adjusting the backrest-adjusting unit, the waist pad adjusting unit and the torso-support adjusting set, enabling the rider ride on the bicycle with comfortableness and safety.

While the preferred embodiment of the invention has been described above, it will be recognized and understood that various modifications may be made therein and the appended claims are intended to cover all such modifications that may fall within the spirit and scope of the invention.

What is claimed is:

1. A backrest adjusting device for a bicycle comprising a backrest adjusting set and a torso-support adjusting set both combined on a frame rod fixed on a bicycle frame:

said backrest adjusting set consisting of a backrest adjusting unit and a waist pad adjusting unit; said backrest adjusting unit having a backrest board, two cylinders fixed at two vertical sides of said backrest board for fitting around said frame rod, a sleeve fixed at an outer side of each said cylinder for combining with said torso-support adjusting set, said backrest board having plural screw holes for screws of a backrest to engage with, plural upper ears fixed juxtaposed on an outer surface of said backrest board, plural lower ears also fixed juxtaposed on an outer surface of said backrest, a lateral bolt extending through said lower ears to pivotally connect an activating rod, said activating rod having an upper end threadably engaging with a pivotal rod fitted around with a spring, said pivotal rod having its inner end pivotally connected with said upper position ears with a pin;

said waist-pad adjusting unit having a waist-pad board, said waist-pad board having plural screws holes, a waist pad having plural screws fixed on a rear surface for engaging said screws holes of said waist-pad board so that said waist pad may be secured tightly with said waist-pad board, two part-threaded rods provided to extending rearward from the rear surface of said waist-pad board, a positioned base provided to be combined with said two part-threaded rods, a spring fitting around each said part-threaded rod between said waist-pad board and said position base, said position base having a sleeve to fit movably around said activating rod of said backrest adjusting unit;

said torso-support adjusting set respectively having an insert rod fitting in each of said sleeves of said backrest board, a connector fixed on an intermediate portion of each said insert rod, said connector having a groove formed in an inner side, said two connectors having plural screw holes, a protective pad connected with each of said two connectors, an elongate protective band provided to have an elongate slot in two side portions for the screws of said two connectors to fit and slide therein.

2. The backrest adjusting device for a bicycle as claimed in claim 1, wherein said frame rod has an elastic projection fitting in one of the holes of each said cylinder, said elastic projection is pressed into each of said cylinders to permit each said cylinder free to move up and down to adjust the height of each said cylinder relative to said frame rod, said elastic projection extending out of the position holes of each said cylinder so that said cylinders may be adjusted in their position for adjusting the locations of said backrest and said waist pad.

3. The backrest adjusting device for a bicycle as claimed in claim 1, wherein said torso-support adjusting set respectively have an insert rod fitting in said sleeves of said backrest board, and said sleeves respectively have slots, and a constrictor is used to secure each said insert rod after each said insert rod is inserted in each said sleeve.

4. The backrest adjusting device for a bicycle as claimed in claim 1, wherein said protective band of said torso-support adjusting set is provided with one or two slots in two side portions for screws to fit movably therein and be tightened at one of many adjustable locations.

* * * * *